United States Patent [19]
Murayama et al.

[11] Patent Number: 5,923,530
[45] Date of Patent: Jul. 13, 1999

[54] ELECTRONIC APPARATUS INCORPORATING A CIRCUIT MODULE HAVING A HEAT SINK

[75] Inventors: Tomomi Murayama; Satoshi Ooka; Yoshinori Kamikawa, all of Tokyo, Japan

[73] Assignee: Kabushiki Kaisha Toshiba, Kawasaki, Japan

[21] Appl. No.: 08/928,402

[22] Filed: Sep. 12, 1997

[30] Foreign Application Priority Data

Sep. 20, 1996 [JP] Japan .................................... 8-250038

[51] Int. Cl.⁶ ...................................................... H05K 7/20
[52] U.S. Cl. .......................... 361/687; 361/704; 361/719; 361/711; 361/699; 257/712; 257/718; 257/737; 165/80.3; 165/185; 174/17 R; 174/52.4; 174/16.3
[58] Field of Search ............................ 361/681, 683–687, 361/689, 690, 695–696, 697, 680, 703, 704, 707, 701, 718, 796, 816, 720, 719, 702–723, 843; 29/843; 257/718, 737, 706–721; 165/80.3, 80.4, 165, 104.33, 185; 174/17 R, 52.4, 16.3, 356 C, 52.3

[56] References Cited

U.S. PATENT DOCUMENTS

| | | | |
|---|---|---|---|
| 4,027,206 | 5/1977 | Lee ........................................... | 361/384 |
| 5,402,311 | 3/1995 | Nakajima ................................. | 361/687 |
| 5,568,360 | 10/1996 | Penniman et al. . | |
| 5,581,443 | 12/1996 | Nakamura et al. ...................... | 361/705 |
| 5,598,320 | 1/1997 | Toedtman et al. . | |
| 5,737,187 | 4/1998 | Nguyen et al. .......................... | 361/704 |
| 5,764,482 | 6/1998 | Meyer, IV et al. . | |

*Primary Examiner*—Leo P. Picard
*Assistant Examiner*—Michael Datskovsky
*Attorney, Agent, or Firm*—Finnegan, Henderson, Farabow, Garrett & Dunner, L.L.P.

[57] ABSTRACT

A circuit module comprising a circuit board, a function component, and a heat sink. The circuit board has a number of circuit components and a circuit element which generates heat while operating. The function component is secured to the circuit board by screws. The heat sink is connected to the circuit board by the screws, for radiating heat generated by the circuit element.

15 Claims, 11 Drawing Sheets

ELECTRONIC APPARATUS INCORPORATING A CIRCUIT MODULE HAVING A HEAT SINK

BACKGROUND OF THE INVENTION

The present invention relates to a circuit module having a circuit board on which heat-generating circuit elements and a heatsink for radiating heat generated by the elements are mounted. The invention also relates to a portable apparatus such as a portable computer, which has a housing containing the circuit module. Particularly, the invention relates to a structure which secures the heatsink to the circuit board.

In recent years, book-type and notebook-type portable computers have remarkably advanced in operating efficiency. In particular, the data-processing speed of CPUs for use in portable computers has been increasing. A CPU of this type is packaged in the form of a single module. The CPU module is mounted on the circuit board provided in the housing of a portable computer.

The faster the CPU processes data, the more power it consumes, and the more heat it generates. When a CPU which generates much heat while operating is provided in a housing, it is necessary to radiate the heat with high efficiency in the housing.

Hitherto, a heatsink is attached to the circuit board on which a CPU is mounted and set in contact with the CPU in order to promote the heat radiation from the CPU. The heatsink has a heat-radiating panel to which heat is transmitted from the CPU. The panel has a number of fins for radiating heat. The panel is supported on the circuit board and exposed within the housing. Natural radiation of the heat transmitted from the CPU to the panel is achieved through the heat-radiating panel in the housing.

The conventional heatsink has a plurality of supports. The circuit board has a plurality of seats, which have a screw hole each. The supports are laid on the seats and fastened thereto by screws. The heatsink is thereby secured to the circuit board.

Portable computers recently developed have housings reduced in size to meet the demand made in the market. There is the trend that the space available in the housing decreases. The circuit board can no longer have its component-mounting area increased. To make matters worse, the component-mounting area is reduced by the total area of the seats which support the heatsink. Consequently, the designer may find it difficult to arrange the circuit component required, including not only the CPU but also various connectors and other components (e.g., a DRAM), in the limited component-mounting area. In the worst case, the component-mounting area may be too small to hold all circuit components.

BRIEF SUMMARY OF THE INVENTION

The present invention has been made in view of the foregoing. Its object is to provide a circuit module in which no area is provided on the circuit board for supporting a heatsink, many circuit components can be arranged in high density on the circuit board. Another object of the invention is to provide a portable apparatus which incorporates the circuit module.

According to a first aspect of the invention, there is provided a circuit module comprising: a circuit board having a number of circuit components and a circuit element which generates heat while operating; a function component secured to the circuit board by fastening means; and a heatsink connected to the circuit board by the fastening means, for radiating heat generated by the circuit element.

When the circuit element operates, generating heat, the heat is absorbed by the heatsink and radiated outwards from the heatsink. The heatsink is fastened to the circuit board by the fastening means which is provided to fasten the function component to the circuit board. Therefore, screw holes for fastening only the heatsink to the board need not be made in the circuit board, and the board provides a component-mounting area larger than the case where it has screw holes for securing the heatsink. All circuit components are therefore easily mounted on the circuit board, without making the board larger.

According to a second aspect of the invention, there is provided a circuit module comprising a circuit board having a number of circuit components and a circuit element which generates heat while operating; a first function component secured to the circuit board by first fastening means; a second function component secured to the circuit board by second fastening means and located adjacent to the first function component; and a heatsink connected to the circuit board by the first fastening means and the second fastening means, for radiating heat generated by the circuit element.

In this module, too, the heat the circuit element generates while operating is absorbed by the heatsink and radiated outwards from the heatsink. The heatsink is fastened to the circuit board by the first and second fastening means which are provided to fasten the first and second function components to the circuit board. Therefore, screw holes for fastening only the heatsink to the board need not be made in the circuit board, and the board provides a component-mounting area larger than the case where it has screw holes for securing the heatsink. All circuit components are therefore easily mounted on the circuit board, without making the board larger.

According to a third aspect of the invention, there is provided a circuit module comprising: a circuit board having a number of circuit components and a circuit element which generates heat while operating; a function component secured to the circuit board by a first group of screws; and a heatsink mounted on the circuit board, for radiating heat generated by the circuit element. The heatsink has a first support section fastened to the circuit board by the first group of screws and a second support section fastened to the circuit board by a second group of screws.

Also in the module according to the third aspect, the heat the circuit element generates while operating is absorbed by the heatsink and radiated outwards from the heatsink. The heatsink is fastened to the circuit board by the screws of the first group which are provided to fasten the function component to the circuit board. Therefore, screw holes for fastening only the heatsink to the board need not be made in the circuit board, though screw holes need to be made in the board to receive the screws of the second group. Thus, the board provides a component-mounting area larger than the case where it has screw holes for securing the heatsink only.

According to a fourth aspect of the invention, there is provided a portable apparatus comprising: a housing; a circuit board provided in the housing and having a number of circuit components and a circuit element which generates heat while operating; a function component fastened to the circuit board by screws; and a heatsink connected to the circuit board by the screws, for radiating heat generated by the circuit element.

In the portable apparatus according to the fourth aspect, the heat the circuit element generates while operating is absorbed by the heatsink and radiated from the heatsink into the interior of the housing. The heatsink is fastened to the circuit board by the fastening means which is provided to fasten the function component to the circuit board. Therefore, screw holes for fastening only the heatsink to the board need not be made in the circuit board, and the board provides a component-mounting area larger than the case where it has screw holes for securing the heatsink. All circuit components are therefore easily mounted on the circuit board, without making the board larger.

According to a fifth aspect of the invention, there is provided a portable apparatus comprising: a housing; a circuit board provided in the housing and having a number of circuit components and a circuit element which generates heat while operating; a function component fastened to the circuit board by a first group of screws; and a heatsink mounted on the circuit board, for radiating heat generated by the circuit element, the heatsink having a first support section fastened to the circuit board by the screws of the first group and a second support section fastened to the circuit board by a second group of screws.

In the portable apparatus according to the fifth aspect, the heat the circuit element generates while operating is absorbed by the heatsink and radiated from the heatsink into the interior of the housing. The heatsink is fastened to the circuit board by the screws of the first group which are provided to fasten the function component to the circuit board. Therefore, screw holes for fastening only the heatsink to the board need not be made in the circuit board, though screw holes need to be made in the board to receive the screws of the second group. Thus, the board provides a component-mounting area larger than the case where it has screw holes for securing the heatsink only.

According to a sixth aspect of the invention, there is provided a portable apparatus comprising: a housing comprising a lower housing made of metal and having a bottom wall, and an upper housing made of synthetic resin, removably coupled with the lower housing and having a top wall opposing the bottom wall; a circuit board provided in the housing, having a number of circuit components and a circuit element which generates heat while operating, and supported by the bottom wall of the lower housing; a function component fastened to the circuit board by screws; and a heatsink connected to the circuit board by the screws and opposing the top wall of the upper housing, for radiating heat generated by the circuit element; and a heat-dissipating plate secured to the heatsink and provided in the housing, for absorbing heat transmitted from the circuit element to the heatsink, the heat-dissipating plate having a heat-dissipating section passing through the top wall and protruding in part from the housing.

In the portable apparatus according to the sixth aspect, the heat the circuit element generates while operating is absorbed by the heatsink and radiated from the heatsink into the interior of the housing. Part of the heat absorbed in the heatsink is dissipated to the heat-dissipating plate and finally into the large space in the housing. Since the heat-radiating section of the heat-dissipating plate is exposed to the atmosphere, the heat transmitted from the circuit element to the heat-dissipating plate is radiated outwards from the housing. As a result, the heat is not accumulated in the housing, enhancing the heat-radiating efficiency of the circuit element.

Furthermore, since the heatsink is fastened to the circuit board by the screws which are provided to fasten the function component to the circuit board. screw holes for fastening only the heatsink to the board need not be made in the circuit board. Thus, the board provides a component-mounting area larger than the case where it has screw holes for securing the heatsink only. All circuit components are therefore easily mounted on the circuit board, without making the board larger.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The first embodiment of the present invention will be described with reference to FIGS. 1 to 15.

Figure 1:
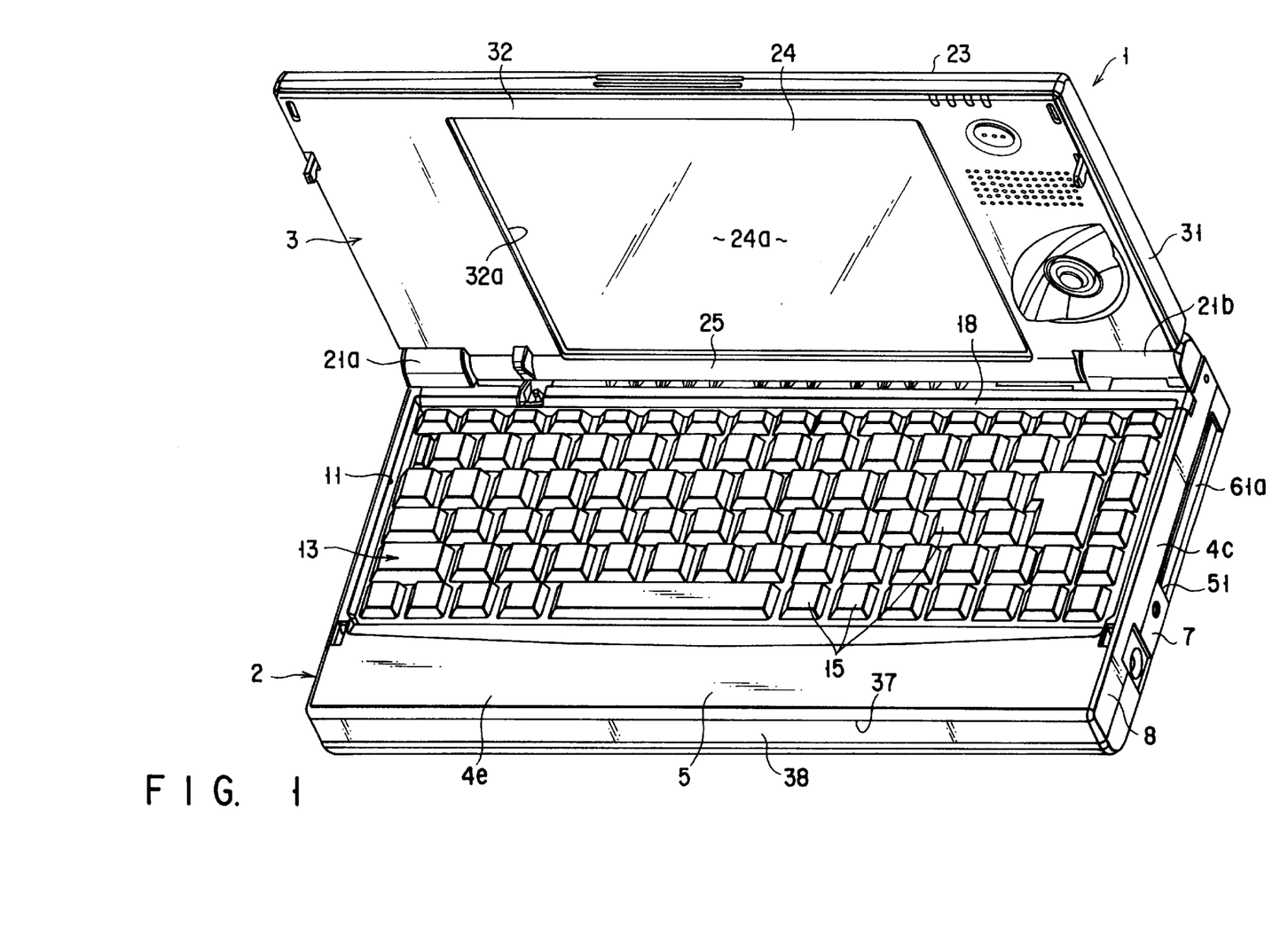
FIG. 1 is a perspective view of a portable computer according to a first embodiment of the present invention.

FIG. 1 shows a portable computer 1 which is small enough to be put into a suit pocket. The computer 1 comprises a flat box-shaped housing 2 and a display unit 3.

The housing 2 is composed of a flat bottom wall 4a, a pair of side walls 4b and 4c, a rear wall 4d, and a top wall 4e. The side walls 4b and 4c extend upwards from and connected to, the left and right edges of the bottom wall 4a, respectively. The rear wall 4d is extend upwards from and connected to the rear edge of the bottom wall 4a. The top wall 4e extend parallel to the bottom wall 4a, thus opposing the bottom wall 4a. The front part of the top wall 4e serves as palm rest 5, which extends in the widthwise direction of the housing 2.

Figure 2:
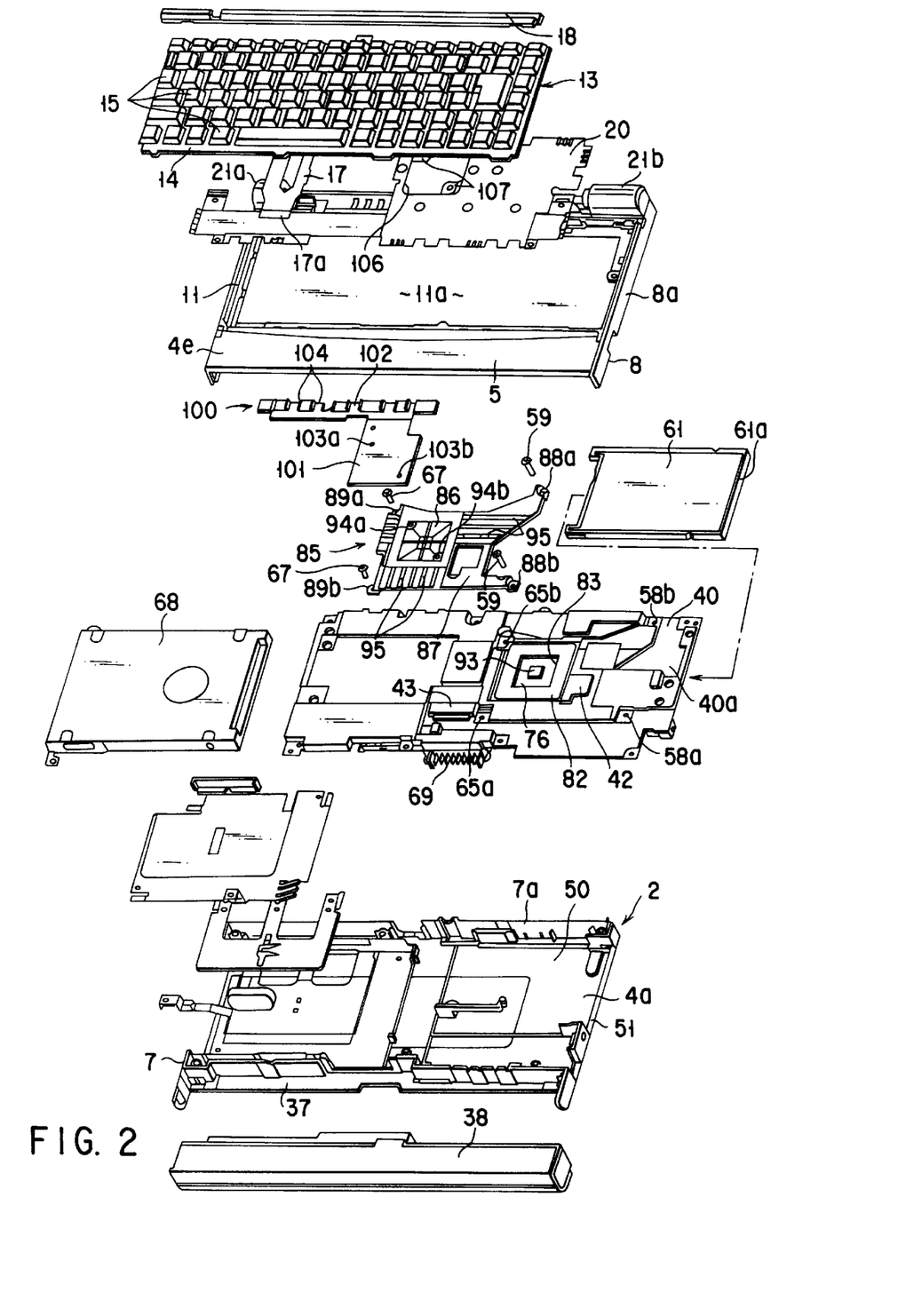
FIG. 2 is an exploded view of the portable computer shown in FIG. 1.

As shown in FIG. 2, the housing 2 comprises a lower housing 7 and an upper housing 8. The lower housing 7 is composed of the bottom wall 4a and three walls 7a extending upwards from the left, right and rear edges of the bottom wall 4a, respectively. The upper housing 8 is composed of the top wall 4e and three walls 8a extending downwards from the left, right and rear edges of the top wall 4e, respectively. The housings 7 and 8 can be separated from each other. The upper housing 8 is removably fastened to the lower housing 7. As long as the upper housing 8 remains fastened to the lower housing 7, the walls 7a and the walls 8a are connected, forming the side walls 4b and 4c and rear wall 4d of the housing 2.

The lower housing 7 is made of metal material having thermal conductivity, such as magnesium alloy. It has been made by means of so-called hybrid molding which is a combination of metal die casting and plastic injection molding. In the hybrid molding, a number of pellets of, for example, magnesium alloy are introduced into a cylinder and heated and stirred in the cylinder until they are made into magnesium alloy slurry. The slurry is injected into the cavity of a mold. The magnesium alloy slurry solidifies in the cavity, forming a desired molding, i.e., the lower housing 7. The upper housing 8 is made of synthetic resin such as ABS resin.

Figures 3, 4, 5:
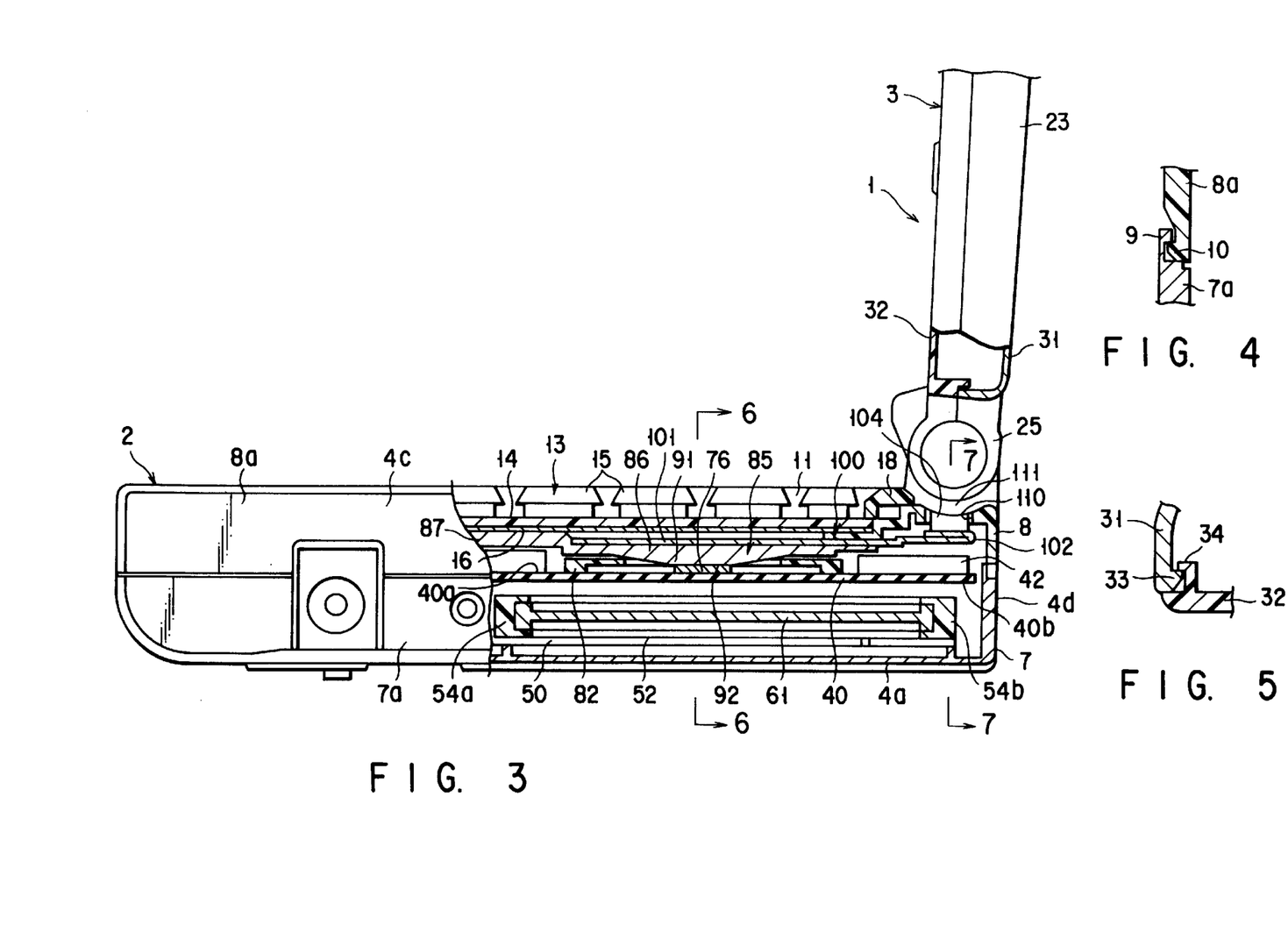
FIG. 3 is a sectional view of the portable computer shown in FIG. 1.
FIG. 4 is a sectional view showing those parts of the lower and upper housings of the computer, which are fastened to each other.
FIG. 5 is a sectional view showing the those parts of the LCD cover and the LCD mask the computer, which are coupled to each other.

As shown in FIG. 4, each wall 7a of the lower housing 7 has its upper edge portion overlapping the lower edge portion of the corresponding wall 8a of the upper housing 8. First claws 9 are formed integral with the upper edge portion of each wall 7a and spaced apart in the longitudinal direction of the wall 7a. Similarly, claws 10 are formed integral with the lower edge portion of each wall 8a and spaced apart in the lengthwise direction of the wall 8a.

Since the upper housing 8 is made of synthetic resin, the walls 8a, each having the claws 10, can elastically bend toward and away from the walls 7a of the lower housing 7. When the upper housing 8 is forced onto the lower housing 7, the walls 8a are elastically deformed at their lower edge portions. The claws 10 therefore go into engagement with the claws 9 formed integral with the walls 7a of the lower housing 7. As a result, the lower housing 7 and the upper housing 8 are fastened to each other, constituting the flat box-shaped housing 2.

As seen from FIG. 2 and as indicated above, the front part of the top wall 4e of the upper housing 8 serves as the palm rest 5. Almost all remaining part, or the rear part, of the top wall 4e serves as a keyboard mounting portion 11. The keyboard mounting portion 11 has a rectangular opening 11a. The opening 11a allows an access to the interior of the housing 2.

Mounted on the keyboard mounting portion 11 is a keyboard 13. The keyboard 13 comprises a panel 14, keys 15 and a reinforcing plate 16. The panel 14 is rectangular, made of synthetic resin and fitted in the keyboard mounting portion 11. The keys 15 are arranged on the panel 14. The plate 16 is made of metal having high thermal conductivity, such as aluminum alloy, and is laid on the lower surface of the panel 14.

The panel 14a and the reinforcing plate 16 are held in place, with their front edges removably secured to the inner surface of the front edge of the keyboard mounting portion 11 and their rear edges fastened to the inner surface of the mounting portion 11 by screws (not shown). The keyboard 13 is thereby removably attached on the keyboard mounting portion 11, covering the opening 11a thereof.

As illustrated in FIG. 2, the keyboard 13 has a flexible printed circuit board 17. The circuit board 17 extends outward from the front edge of the panel 14, it is guided into the housing 2 through the opening 11a of the keyboard mounting portion 11. The circuit board 17 has a terminal section 17a at its distal end.

As FIGS. 2 and 3 show, a cover 18 is removably attached to the rear end of the keyboard mounting portion 11. The cover 18 is shaped like a rod, extending in the widthwise direction of the upper housing 8. The cover 18 is located between the rearmost row of keys 15 on the panel 14 and the rear end of the keyboard mounting portion 11. Thus located, the cover 18 covers the screws which fasten the keyboard 13 to the keyboard mounting portion 11.

Hence, the keyboard 13 can be removed from the keyboard mounting portion 11, by first removing the cover 18 from the upper housing 8, then releasing the keyboard 13 from the mounting portion 11 removing the screws, and finally pulling up the keyboard 13, while holding the rear end thereof. Once the keyboard 13 is thus removed, the interior of the housing 2 exposed through the opening 11a of the keyboard mounting portion 11.

A metal shield 20 is provided on the reinforcing plate 16 of the keyboard 13 and is located in the opening 11a of the keyboard mounting portion 11. So located, the shield 20 prevents the switching noise generated as the keys 15 are operated, from leaking into the housing 2.

Figure 6:
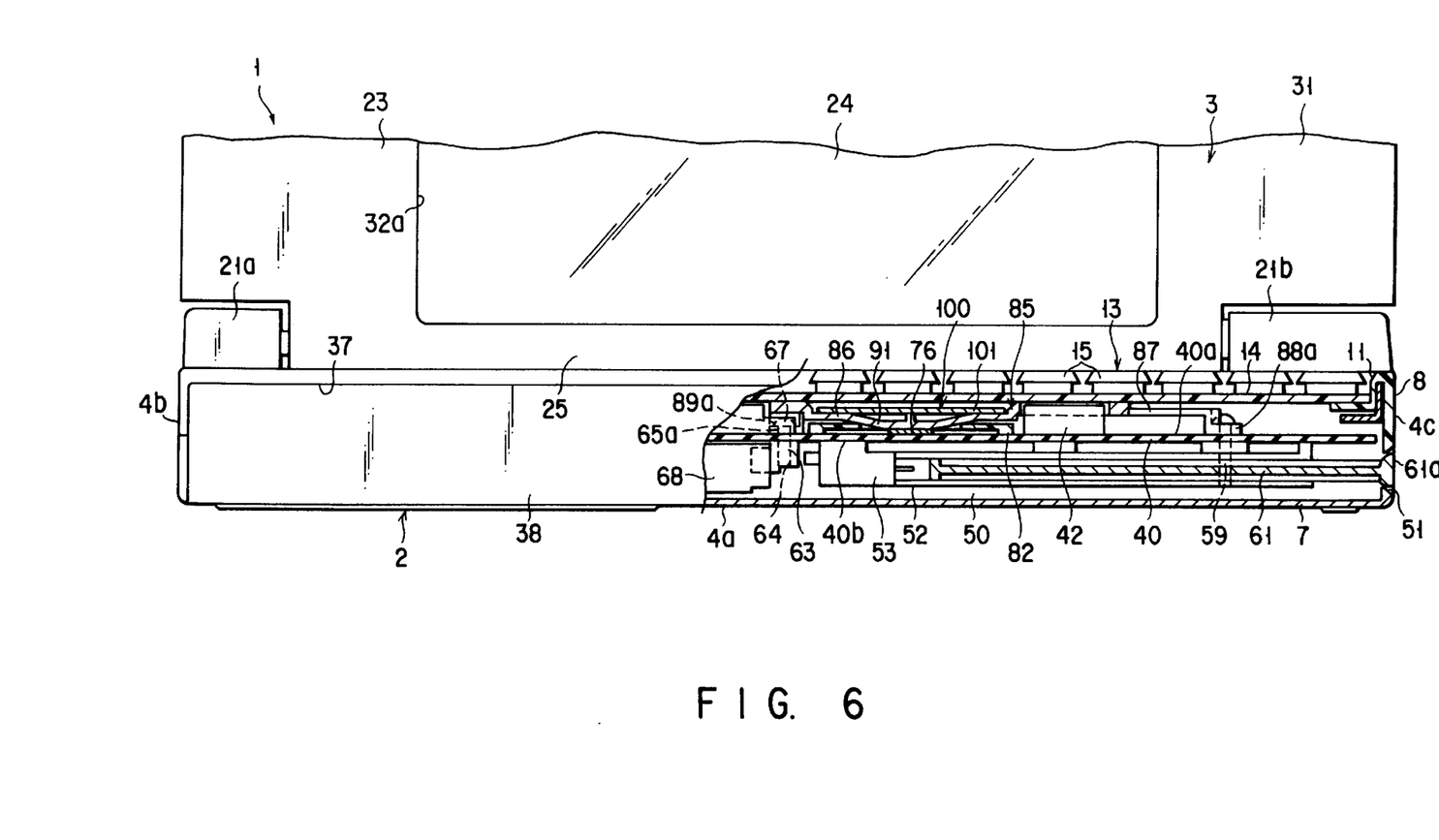
FIG. 6 is a sectional view, taken along line 6—6 in FIG. 3.
Figure 7:
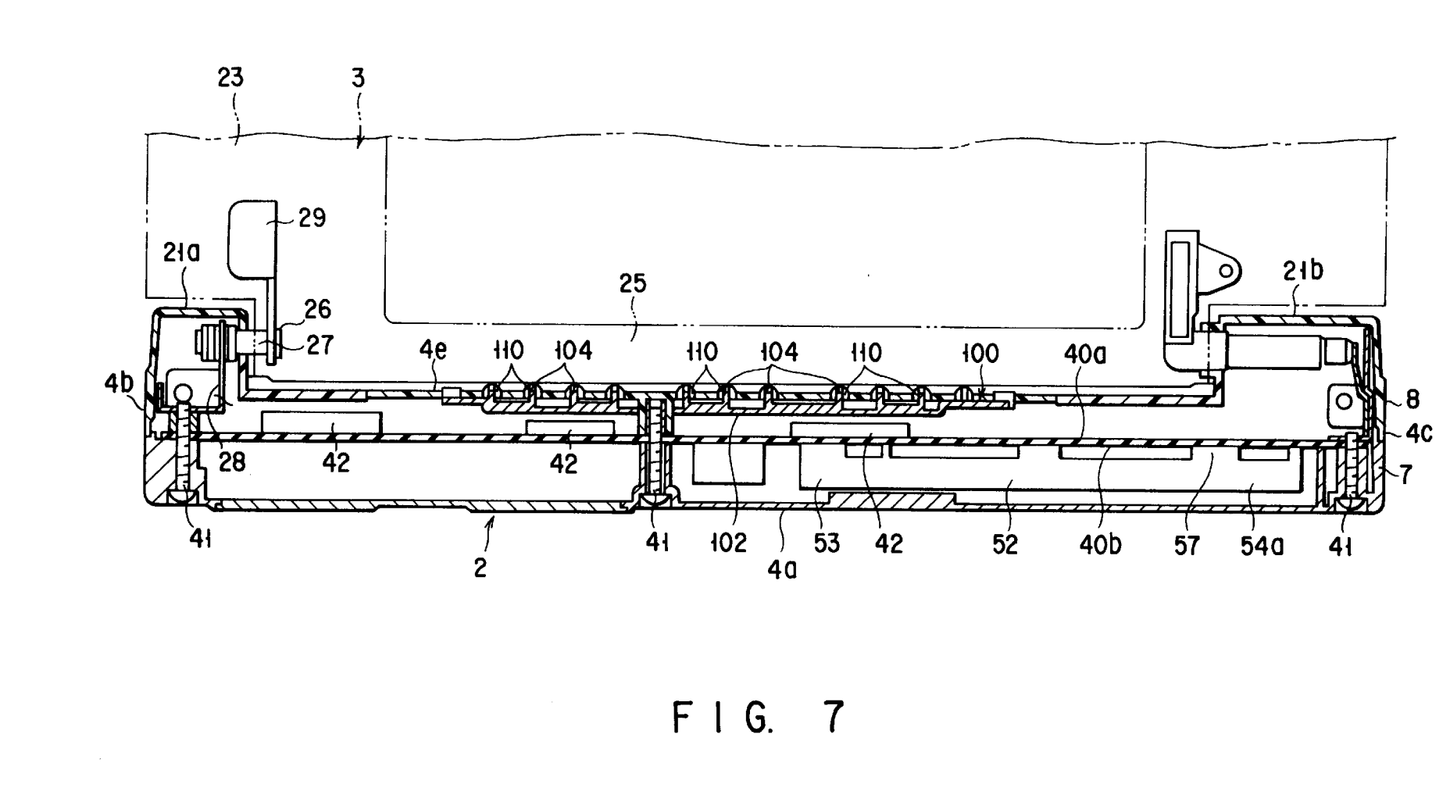
FIG. 7 is a sectional view, taken along line 7—7 in FIG. 3.

As seen from FIGS. 1, 6 and 7, a pair of display-holding sections 21a and 21b are fastened to the rear end of the top wall 4e. These sections 21a and 21b are spaced part in the widthwise direction of the housing 2. They connect the display unit 3 to the housing 2.

The display unit 3 comprises a flat box-shaped housing 23 and a color liquid-crystal display 24 incorporated in the housing 23. The housing 23 has a coupling section 25 at its lower end, which extends in the widthwise direction of the housing 2. The coupling section 25 is located between the display-holding sections 21a and 21b. The section 25 has its left end connected to the housing 2 by a hinge device 26.

As illustrated in FIG. 7, the hinge device 26 comprises a shaft 27 and two brackets 28 and 29. The shaft 27 extends horizontally. The shaft 27 consists of a first part inserted in the left display-holding section 21a of the housing 2 and a second part inserted in the coupling section 25 of the housing 23. The first bracket 28 is rotatably coupled to first part of the shaft 27, located in the upper housing 8 and fastened to the lower housing 7 and the upper housing 8 by screws. The second bracket 29 is fixed to the second part of the shaft 27, located in the housing 23 of the display unit 3 and fastened to the housing 23 by screws.

The display unit 3 is thus supported on the housing 2. It can rotate around the shaft 27 of the hinge device 26, between a closed position and an opened position. While placed in the closed position, the unit 3 covers the palm rest 5 and the keyboard 13. While placed in the opened position, the unit 3 exposes the palm rest 5 and the keyboard 13.

As seen from FIGS. 1 and 3, the housing 23 of the display unit 3 comprises an LCD cover 31 and an LCD mask 32. The LCD cover 31 holds the color liquid-crystal display 24. The LCD mask 32 has a rectangular opening 32a. The screen 24a of the display 24 is exposed through the opening 32a.

The LCD cover 31 is made of metal material having thermal conductivity, such as magnesium alloy. Like the lower housing 7, the cover 31 has been made by means of hybrid molding, i.e., a combination of metal die casting and plastic injection molding. The LCD mask 32 is made of synthetic resin such as ABS resin.

The mask 32 is removably attached to the LCD cover 31. As shown in FIG. 5, the LCD cover 31 and the LCD mask 32 abut on each other at peripheries. First claws 33 are formed integral with the periphery of the LCD cover 31 and spaced apart from one another. Second claws 34 are formed integral with the periphery of the LCD mask 32 and spaced apart from one another. Since the LCD mask 32 is made of synthetic resin, its peripheral edge and the claws 34 can be elastically deformed. Therefore, when the LCD mask 32 is forced onto the LCD cover 31, the peripheral edge of the LCD mask 32 is elastically deformed. The claws 34 therefore go into engagement with the claws 33 formed integral with the LCD cover 31. The LCD cover 31 and the LCD mask 32 are thereby fastened together, constituting the flat box-shaped housing 23.

The LCD cover 31 is located above the LCD mask 32, thus constituting the upper surface of the housing 23, as long as the display unit 3 is placed in the closed position. The LCD cover 31 is made of metal and is therefore rigid, just like the lower housing 7 which is the bottom of the housing 2. Hence, while the display unit 3 remains in the closed position, the metal parts form almost all of the outer shell of computer 1. In this condition, the outer shell of the computer 1 can withstand a pressure which may be externally exerted to it while the computer 1 is being transported. Thus, the housing 2 and the display unit 3 are very unlikely to be broken.

As FIGS. 1 and 2 show, the housing 2 has a battery receptacle 37. The battery receptacle 37 is located below the palm rest 5 and extends in the widthwise direction of the housing 2. The receptacle 37 is generally an elongated box which opens at the bottom and front. Removably set in the receptacle 37 is a battery pack 38. The battery pack 38 is used to drive the computer 1 when the computer 1 is used in a place where no commercial AC power supply is available.

As is shown in FIGS. 2, 3, 6 and 7, a circuit board 40 is provided in the housing 2. The circuit board 40 is secured to the bottom wall 4a of the lower housing 7 by screws 41. The board 40 is located below the keyboard 13, extending substantially parallel to the bottom wall 4a.

The circuit board 40 has an upper surface 40a (first surface) and a lower surface 40b (second surface). Mounted on the upper surface 40a are various circuit components 42 (including a DRAM) and a keyboard connector 43. The keyboard connector 43 is positioned below the front end of the keyboard mounting portion 11. To the connector 43 there is removably connected the terminal section 17a of the flexible printed circuit board 17.

As described above, the keyboard 13 can be removed from the keyboard mounting portion 11 if it is pulled up. When the keyboard 13 is pulled upwards, a tensile force may be applied to the flexible printed circuit board 17 or an excessive force may be exerted on the junction between the terminal section 17a and the keyboard connector 43. To avoid this, two stopper belts 45 and 46 provided, each fastened at one end to the housing 2 and at the other end to the reinforcing plate 16. The belts 45 and 46 are made of soft polyethylene film. They are spaced part in the widthwise direction of the housing 2. The terminal section 17a is located between the stopper belts 45 and 46.

More specifically, the stop belts 45 and 46 have their ends 45a and 46a connected to the lower surface of the reinforcing plate 16 by means of adhesive tape (not shown), and their ends 45b and 46b fastened to the metal shield 20 by means of screws.

Figure 8:
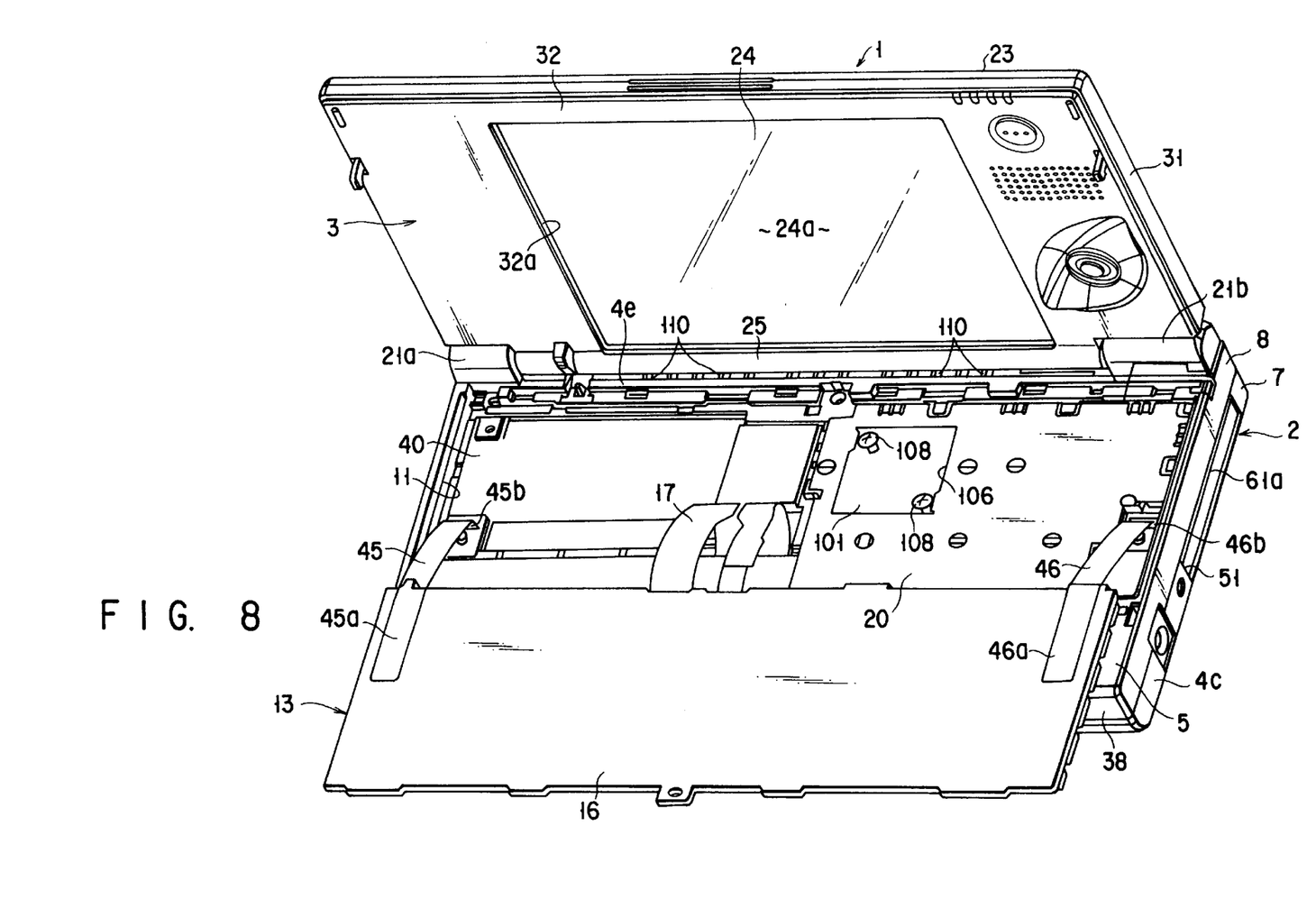
FIG. 8 is a perspective view of the portable computer, with the keyboard removed from the keyboard mounting portion.

As can be understood from FIG. 8, both stopper belts 45 and 46 are shorter than the flexible printed circuit board 17. Hence, the keyboard 13 cannot be further pulled up once the stopper belts 45 and 46 are stretched tense, and the flexible printed circuit board 17 remains loose and arching. No tensile force is applied to the flexible printed circuit board 17. Nor is an excessive force exerted on the junction between the terminal section 17a and the keyboard connector 43. The flexible printed circuit board 17 is thus prevented from being cut.

As shown in FIGS. 3 and 6, a card receptacle 50 is provided in the housing 2, for holding an extension card (not shown) such as a PCMCIA (Personal Computer Memory Card International Association) card. More precisely, the card receptacle 50 is located in the right half of the housing 2, between the lower surface 40b of the circuit board 40 and the bottom wall 4a of the lower housing 7. The receptacle 50 has a card slot 51. The slot 51 is made in the right side wall 4c of the housing 2 and extends in the depth direction of the housing 2.

Figure 10:
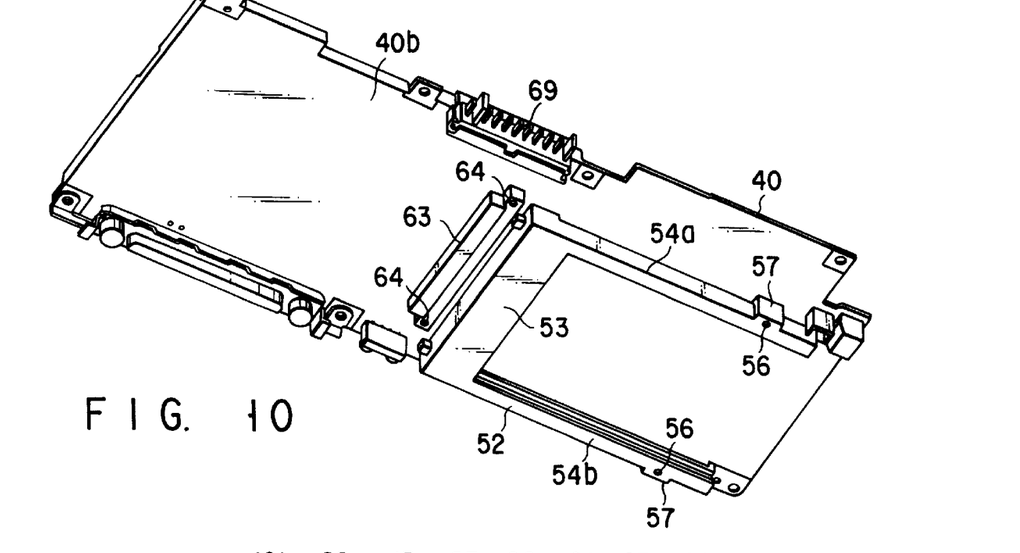
FIG. 10 is a perspective view of the circuit module with the card holder and hard disk connector secured to the lower surface of the circuit board.

Provided in the card receptacle 50 is a card holder 52 which serves as a first function component. As shown in FIG. 10, the card holder 52 is secured to the lower surface 40b of the circuit board 40. The holder 52 comprises a card connector 53 and a pair of guides 54a and 54b. The card connector 53 has a number of pin terminals. Both guides 54a and 54b are continuous to the card connector 53.

An extension card can be connected to and disconnected from the card connector 53. The connector 53 opposes the card slot 51. The guides 54a and 54b are provided for guiding the extension card from the card slot 51 to the card connector 53. The guides 54a and 54b extend parallel to each other. They have a boss 57 each. The bosses 57 have a screw hole 56 each and are located closer to the card slot 51 than to the card connector 53.

Figure 9:
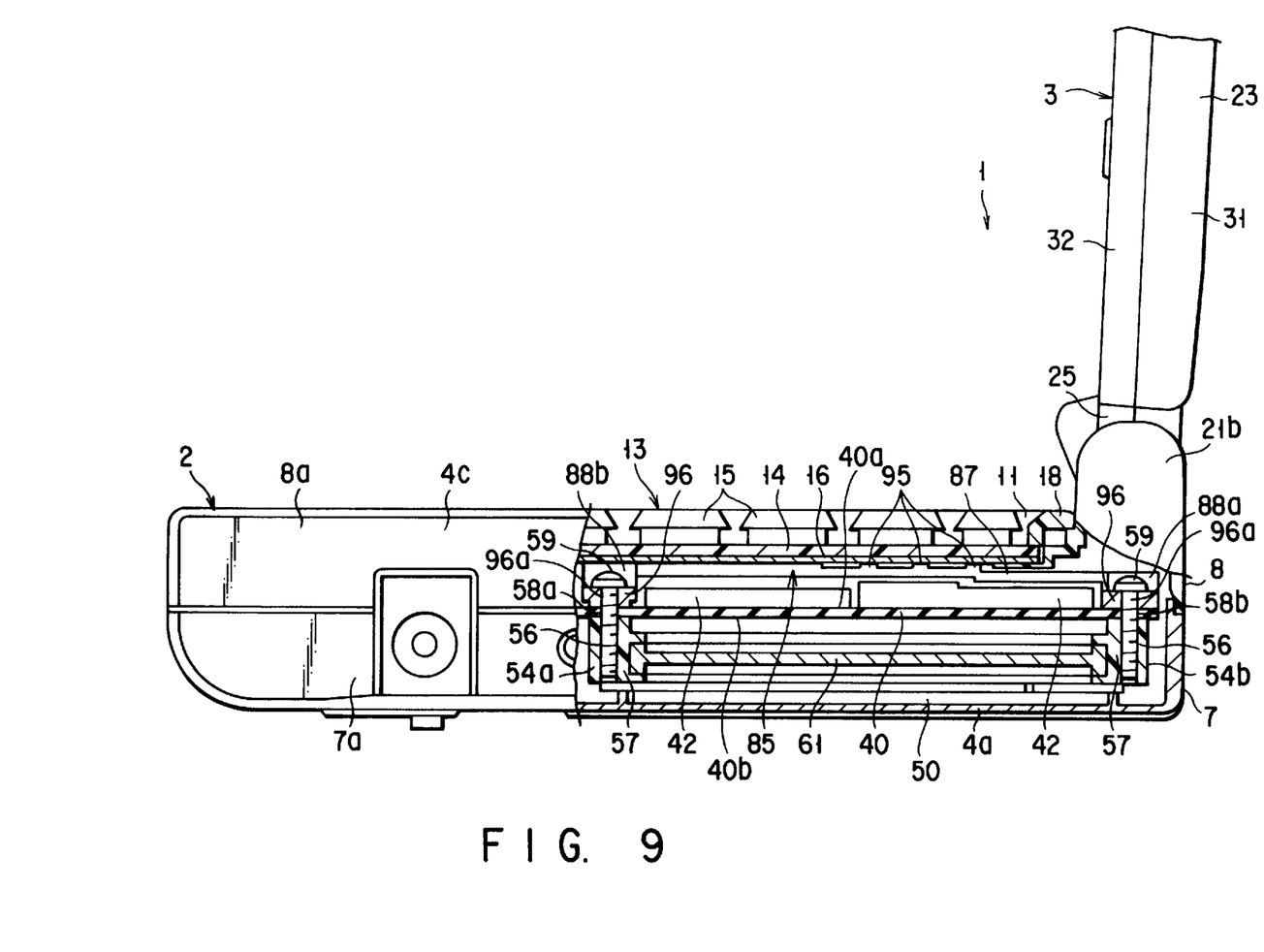
FIG. 9 is a sectional view of the portable computer, showing the heatsink pad.

As illustrated in FIG. 9, the circuit board 40 has two through holes 58a and 58b which are axially aligned with the screw holes 56 of the bosses 57. Two screws 59 pass through the holes 58a and 58b from above the circuit board 40 and set in the screw holes 56. The guides 54a and 54b of the card holder 52 are thereby fastened to the circuit board 40.

As FIGS. 2 and 6 show, the card receptacle 50 opens to the outside through the card slot 51. A slot-closing member 61 is provided in the card receptacle 50. More correctly, the slot-closing member 61 is located in the gap between the lower surface 40b of the circuit board 40 and the bottom wall 4a of the lower housing 7. The member 61 can be pulled from the receptacle 50 through the card slot 51. The member 61 is made of metal having high thermal conductivity, such as aluminum alloy, and is similar in shape to the extension card. The member 61 has closing surface 61a at the front end. The closing surface 61a keeps closing the card slot 51 and is exposed to the outside through the slot 51, as long the member 61 remains in the card receptacle 50.

As seen from FIGS. 6 and 10, a hard disk connector 63, which serves as a second function component, is secured to the lower surface 40b of the circuit board 40. The hard disk connector 63 is positioned at the center part of the circuit board 40 and adjacent to the card connector 53. The connector 63 extends in the depth direction of the housing 2. It has two screw holes 64, which are spaced part in the lengthwise direction of the hard disk connector 63.

As shown in FIGS. 2 and 6, the circuit board 40 has a pair of through holes 65a and 65b which are axially aligned with the screw holes 64 of the hard disk connector 63. Two screws 67 are inserted in the through holes 65a and 65b from above the circuit board 40 and are set in the screw holes 64 of the hard disk connector 63. The hard disk connector 63 is thereby secured to the circuit board 40.

As seen from FIG. 6, a hard disk drive 68 is connected to the hard disk connector 63. It is provided between the lower surface 40b of the circuit board 40 and the bottom wall 4a of the lower housing 7. The drive 68 is fastened by screws to the lower surface 40b of the circuit board 40.

As FIG. 2 shows, a battery connector 69 is arranged on the lower surface 40b of the circuit board 40, at the front-middle part of the board 40. The battery connector 69 is exposed to the battery receptacle 37. It is removably connected to the battery pack 38 which is set in the receptacle 37.

Figure 11:
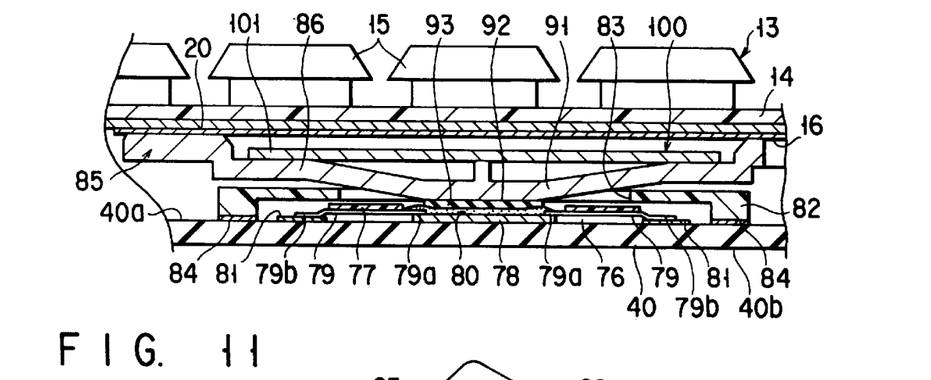
FIG. 11 is a sectional view illustrating the positional relationship between the TCP and the heatsink, both mounted on the circuit board.
Figure 12:
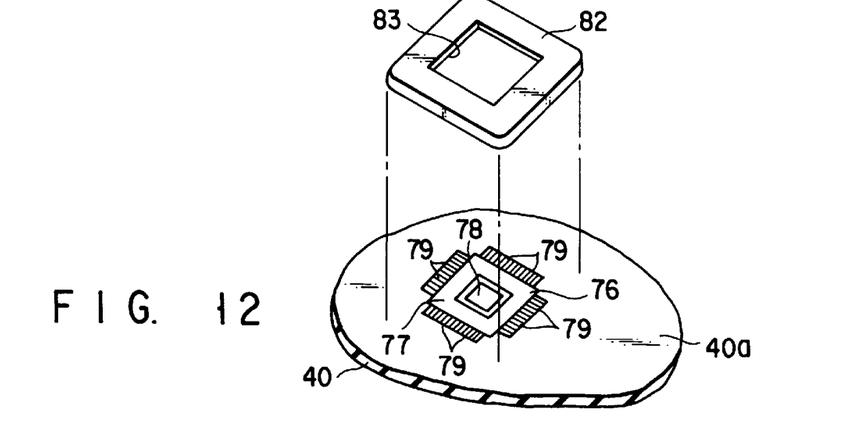
FIG. 12 is a perspective view showing the positional relationship between the TCP and the lead cover, both mounted on the circuit board.

As illustrated in FIGS. 11 and 12, a TCP (Tape Carrier Package) 76, a circuit element, is mounted on the upper surface 40a of the circuit board 40. The TCP 76 functions as the CPU of the computer 1. The faster the computer 1 operates, the more power the TCP 76 will consume. The more power it consumes, the more heat the TCP 76 will generate.

The TCP 76 comprises a carrier 77, an IC chip 78, and a number of leads 79. The carrier 77 is made of soft resin film and is square, having four sides. The IC chip 78 generates heat while operating. The leads 79 are made of copper foil, each having a first end 79a and a second end 79b. The first end 79a of each lead 79 is soldered to a bump on the IC chip 78. The lead-bump junctions are covered with a layer 80 of potting resin. The second ends 79b of the leads 79 extend outwards from the four sides of the carrier 77.

The TCP 76 assumes a so-called "face-up position" with respect to the circuit board 40. In other words, it is positioned, with lead-bump junctions facing away from the circuit board 40. A number of pads 81 are formed on the upper surface 40a of the circuit board 40. The pads 81 are soldered to the second ends 79b of the leads 79, respectively. As shown in FIG. 6, the TCP 76 is located above the card connector 53. As illustrated in FIGS. 2, 11 and 12, a lead cover 82 made of synthetic resin is laid on the upper surface 40a of the circuit board 40. The cover 82 protects the junctions between the pads 81, on the one hand, and the second ends 79b of the leads 79, on the other hand. The cover 82 is fixed to the circuit board 40 by adhesive tape 84. The lead cover 82 has an opening 83 in its center part. The opening 83 is aligned with the IC chip 78. The IC chip 78 has its upper surface exposed through the opening 83.

Figure 13:
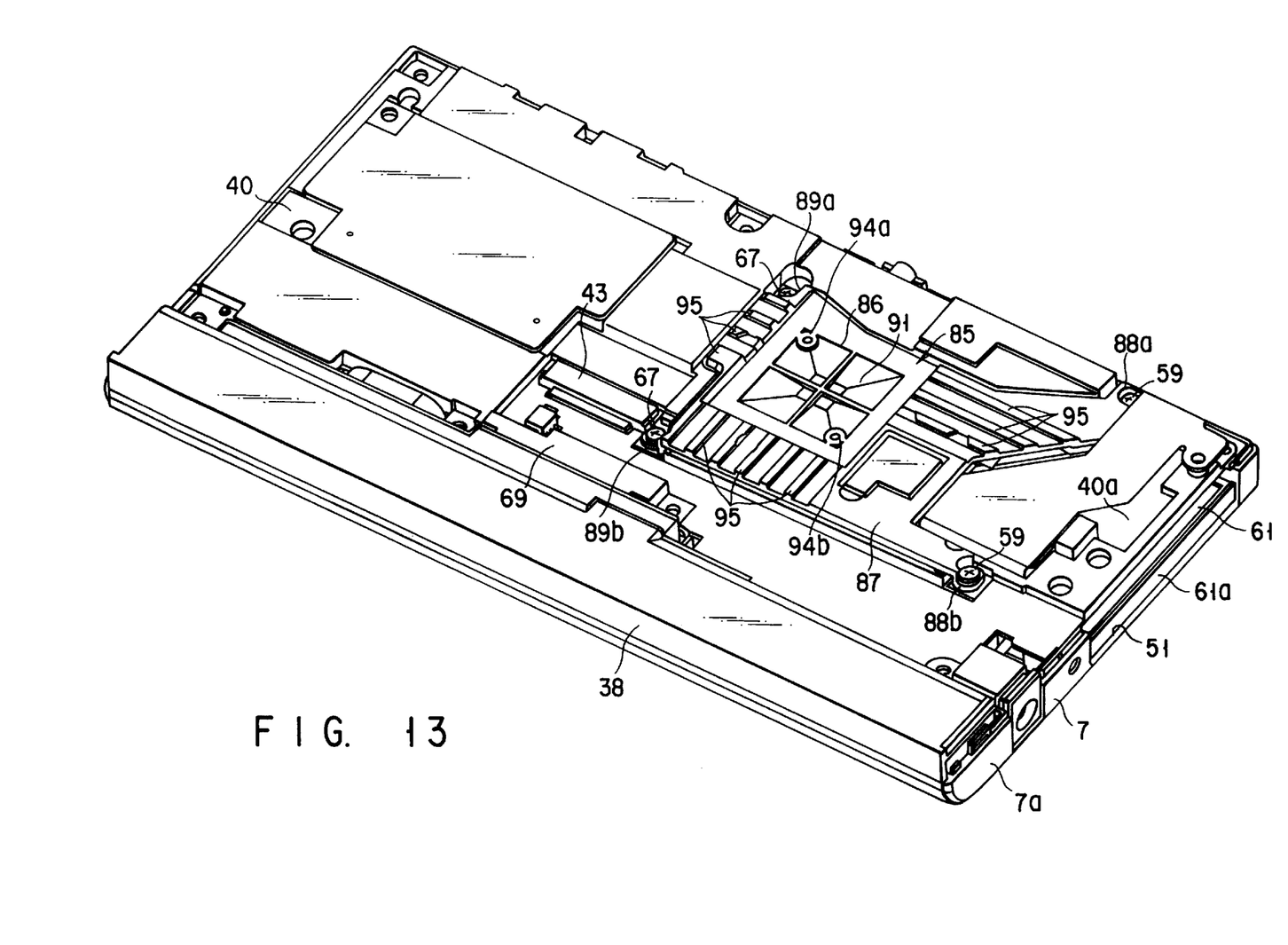
FIG. 13 is a perspective view of the lower housing holding the circuit board on which the heatsink is mounted.

As FIGS. 2 and 13 show, a heatsink 85 is mounted on the upper surface 40a of the circuit board 40, in vertical alignment with the TCP 76. The heatsink 85 is made of metal having high thermal conductivity, such as aluminum alloy or copper-based alloy. The heatsink 85 is located below the metal shield 20. The metal shield 20 is larger than the heatsink 85.

The heatsink 85 comprises a heat-receiving section 86 and a heat-dissipating section 87 contacting the heat-receiving section 86. The heat-receiving section 86 opposes the TCP 76. As seen from FIGS. 3, 6 and 15, the heat-receiving section 86 is square and has substantially the same size as the lead cover 82. The section 86 has two screw holes 94a and 94b made in two corners diagonal to each other.

Figure 15:
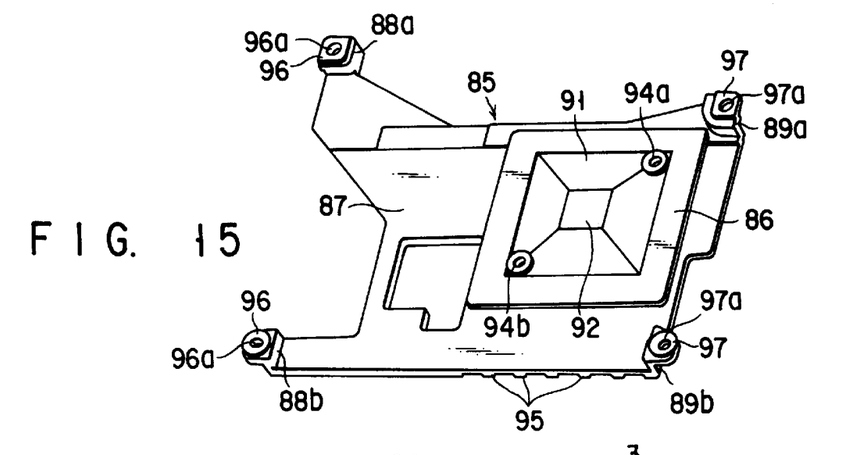
FIG. 15 is a perspective view of the heatsink.

A projection 91 is formed on the lower surface of the heat-receiving section 86. The projection 91 has a flat top, or a heat-receiving surface 92. As viewed from below, the surface 92 is located between the screw holes 94a and 94b which are made in two corners of the heat-receiving section 86. The heat-receiving surface 92 has the same size as the IC chip 78 and opposes the IC chip 78. A rubber-like elastic layer 93 is interposed between the IC chip 78 and the heat-receiving surface 92. Therefore, the heat the IC chip 78 generates when operating is transmitted via the layer 93 to the heat-receiving section 86.

As shown in FIG. 13, the heat-dissipating section 87 of the heatsink 85 extends from the heat-receiving section 86 to the front and both sides of the circuit board 40. The section 87 is arranged substantially in parallel to the circuit board 40. Heat-radiating fins 95 are Formed integral with the section 87 and arranged on the upper surface thereof. The heat-radiating fins 95 contact the lower surface of the metal shield 20 at their tops.

The right end portion of the heat-dissipating section 87 is located above the through holes 58a and 58b of the circuit board 40. On the other hand, the left end portion of the section 87 is located above the screw holes 65a and 65b of the circuit board 40. Two legs 88a and 88b are formed integral with the right side of the heat-dissipating section 87. As seen from FIGS. 9 and 13, the legs 88a and 88b are spaced apart in the depthwise direction of the housing 2. The legs 88a and 88b have a seat 96 each, which contacts the upper surface 40a of the circuit board 40. The seat 96 of the leg 88a has a through hole 96a axially aligned with the through holes 58a of the circuit board 40. Similarly, the seat 96 of the leg 88b has a through hole 96b axially aligned with the through hole 58b of the circuit board 40. The screws 59 pass through the holes 96a and 96b of the legs 88a and 88b and the holes 58a and 58b of the circuit board 40 and are set in the screw holes 56 of the card holder 52. The legs 88a and 88b are vertically aligned with the guides 54a and 54b of the card holder 52 which is positioned below the circuit board 40.

As shown in FIGS. 13 and 15, two legs 89a and 89b are formed integral with the left side of the heat-dissipating section 87. The legs 89a and 89b are spaced apart in the depthwise direction of the housing 2. The legs 89a and 89b have a seat 97 each, which contacts the upper surface 40a of the circuit board 40. The seat 97 of the leg 89a has a through hole 97a axially aligned with the through holes 65a of the circuit board 40. Similarly, the seat 97 of the leg 89b has a through hole 97b axially aligned with the through hole 65b of the circuit board 40. The screws 67 pass through the holes 97a and 97b of the legs 89a and 89b and the holes 65a and 65b of the circuit board 40 and are set in the screw holes 64 of the hard disk connector 63. The legs 89a and 89b are located above the hard disk connector 63 which is positioned below the circuit board 40.

Thus, the heatsink 85 is sutured to the upper surface 40a of the circuit board 40 by the screws 59 which fasten the card holder 52 to the board 40 and by the screws 67 which fasten the hard disk connector 63 to the board 40.

Figure 14:
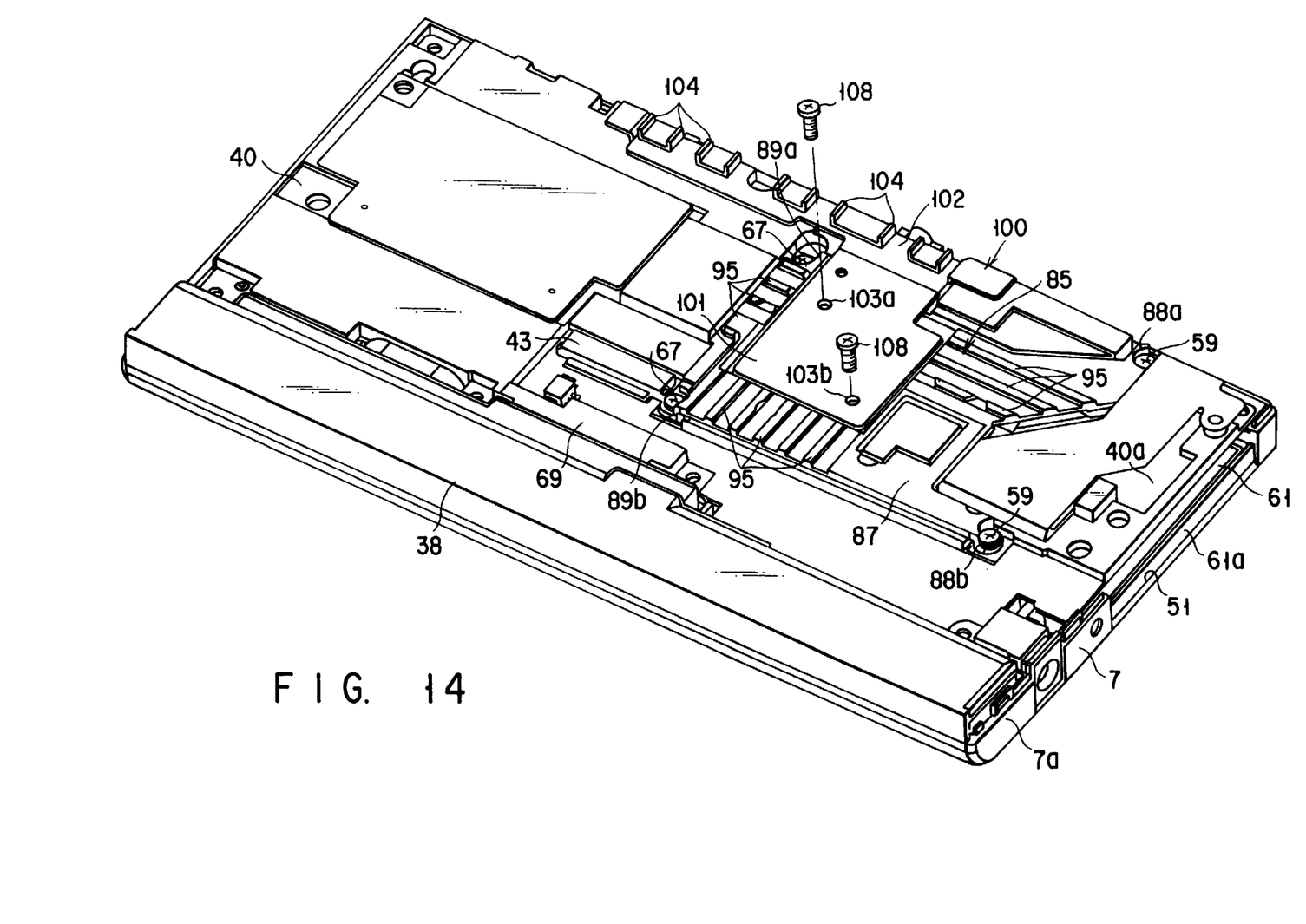
FIG. 14 is a perspective view of the lower housing, representing the positional relationship between the heatsink and the heat-dissipating plate.

As shown in FIGS. 2, 11 and 14, a heat-dissipating plate 100 is provided between the keyboard 13 and the heatsink 85. The plate 100 is made of metal having high thermal conductivity, such as aluminum alloy. The plate 100 comprises a heat-conducting section 101 and a heat-radiating section 102 which are formed integral with each other.

The heat-conducting section 101 is a square plate having almost the same size as the heat-receiving section 86 of the heatsink 85. The section 101 has two through holes 103a and 103b. The holes 103a and 103b are axially aligned with the screw holes 94a and 94b of the heat-receiving section 86.

The heat-radiating section 102 is shaped like a band, extending in the widthwise direction of the housing 2. The section 102 is located at the back of the keyboard mounting portion 11 and extends along the top wall 4e of the upper housing 8. A number of heat-radiating projections 104 protrude from the upper surface of the heat-radiating section 102. The projections 104 are arranged in a row, spaced apart from one another in the width direction of the housing 2.

The heat-dissipating plate 100 is fastened to the lower surface of the top wall 4e of the upper housing 8 by means of an adhesive tape (not shown). The heat-conducting section 101 of the plate 100 is thereby provided in the opening 11a of the keyboard mounting portion 11.

The heat-conducting section 101 of the plate 100 is positioned below the metal shield 20. As shown in FIGS. 2 and 8, the shield 20 has a square opening 106, through which the heat-conducting section 101 is exposed. Two tongues 107 extend from diagonally opposing corners of the square opening 106, and are formed integral with the metal shield 20. The tongues 107 contact the upper surface of the heat-conducting section 101 and have a through hole each. The through holes of the tongues 107 are axially aligned with the through holes 103a and 103b of the heat-conducting section 101.

The heat-conducting section 101 remains mounted on the upper surface of the heat-receiving section 86 as long as the upper housing 8 is coupled with the lower housing 7. Two screws 108 pass through the holes 103a 103b of the heat-conducting section 101 and also through the holes of the tongues 107 and are set in the screw holes 94a and 94b of the heat-receiving section 86. The heat-conducting section 101 is thereby secured to the upper surface of the heat-receiving section 86.

As shown in FIGS. 3 and 7, a number of heat-radiating holes 110 are made in the rear end portion of the top wall 4e which opposes the heat-radiating section 102. These holes 110 are arranged in a row and between the display-holding sections 21a and 21b, spaced apart from one another in the widthwise direction of the housing 2. The heat-radiating holes open to the coupling section 25 of the housing 23. A gap 111 is provided between the rear end portion of the top wall 4e and the coupling section 25 of the housing 23.

The projections 104 of the heat-radiating section 102 are inserted in the heat-radiating holes 110, respectively. The tips of the projections 104 are exposed to the gap 111 through the heat-radiating holes 110, but are covered and concealed by the coupling section 25.

While the computer 1 is operating, the IC chip 78 generates heat as the TCP 76 consumes electric power. Most of the heat is transmitted to the heat-receiving section 86. This is because the IC chip 78 is contacts the elastic layer 93, which in turn contacts the heat-receiving section 86.

As mentioned above, the heat-dissipating section 87 of the heatsink 85 extends from the heat-receiving section 86 to the front and both sides of the circuit board 40. Therefore, the heat transmitted to the section 86 is applied to the section 87 and hence dissipated into the entire heat-dissipating section 87. Having a number of heat-radiating fins 95, the section 87 has a large air-contact area. Due to the large air-contact area, the heat is fast transmitted from the heatsink 85 to the circuit board 40. Since the board 40 is large, it efficiently radiates the heat in the housing 2, achieving natural cooling.

The metal shield 20 contacting the heat-radiating fins 95 is mounted on the reinforcing plate 16 of the keyboard 13. Hence, the heat transmitted from the IC chip 78 to the heatsink 85 is conducted to the reinforcing plate 16 through the metal shield 20. Larger than the heatsink 85, the metal shield 20 can conduct the heat from the heatsink 85 evenly to the reinforcing plate 16. The heat would be concentrated in no part of the reinforcing plate 16. The heat the IC chip 78 has generated is efficiently conducted to the housing 2 and keyboard 13 by way of the heatsink 85. That is, heat can be radiated from the TCP 76 with high efficiently.

The heat-receiving section 86 of the heatsink 85 contacts the heat-conducting section 101 of the heat-dissipating plate 100. The heat transmitted from the IC chip 76 to the heat-receiving section 86 is dissipated into the heat-radiating section 102 via the heat-conducting section 101. The projections 104 of the heat-radiating section 102 are exposed to the atmosphere, because they are exposed to the gap 111 between the housing 2 and the display unit 3 through the heat-radiating holes 110 of the upper housing 8. The heat transmitted to the heat-radiating section 102 is therefore radiated outwards from the housing 2. Hence, the heat emanating from the TCP 76 is not accumulated in the housing 2. This enhances the efficiency of radiating heat from the TCP 76.

The slot-closing member 61 made of metal and provided in the card receptacle 50 opposes the lower surface 40a of the circuit board 40. Heat is therefore efficiently conducted from the circuit board 40 and housing 2 to the member 61. Since the closing surface 61a of the member 61 is exposed to the atmosphere through the card slot 51, the heat transmitted to the member 61 is radiated from the housing 2 through the member 61. Used as a heatsink, the member 61 which closes the slot 51 serves to radiate efficiently heat from the housing 2.

The lower housing 7 efficiently dissipate heat from the housing 2 because it is made of metal material superior to resin in thermal conductivity and is exposed to the atmosphere. Therefore, heat is hardly be accumulated in the housing 2, and the ambient temperature of the circuit board 40 and TCP 76 remains sufficiently low.

As described above, the lower housing 7 is made of metal material (e.g., magnesium alloy), it is sufficiently rigid, while its bottom wall 4a and side walls 7a are relatively thin. The lower housing 7 is therefore light, and the housing 2 is proportionally light. Further, a greater space is available in the lower housing 7 than in the case where the housing 7 is made of resin and its walls 4a and 7a are inevitably thick.

As indicated above, the heatsink 85 is fastened to the circuit board 40 by the screws 59 which fasten the card holder 52 to the board 40 and by the screws 67 which fasten the hard disk connector 63 to the board 40. Therefore, screw holes need not be made in the board 40 to fasten only the heatsink 85 to the circuit board 40. As a result of this, the board 40 provides a component-mounting area which is larger than the case where it has screw holes for securing the heatsink 85. All circuit components 42 are, therefore, easily mounted on the board 40 in high density.

The heatsink 85 for receiving the heat from the TCP 76 is arranged on the upper surface 40a of the circuit board 40, while the card holder 52 and hard disk connector 63 are arranged on the lower surface 40b of the board 40. The heatsink 85 does not contact either the card holder 52 or the hard disk connector 63. The heat generated by the TCP 76 little influences the card holder 52 and the hard disk connector 63.

The heatsink 85 is fastened to the circuit board 40 by the screws 59 fastening the card holder 52 to the board 40 and by the screws 67 fastening the hard disk connector 63 to the board 40. This means that the heatsink 85 is attached to the board 40 after the circuit components 42 and the TCP 76 have been mounted on the circuit board 40. Suppose the parts of the leads 79 of the TCP 76 are exposed on the upper surface 40a of the circuit board 40. The user's hand or a tool may touch these parts of the leads 79 in the process of securing the heatsink 85 to the board 40, and the leads 79 may be cut. To prevent such cutting of the leads 79, the lead cover 82 is fixed to the circuit board 40, covering and protecting the leads 79. Hence, the leads 79 remains connected to the circuit board 40.

The present invention is not limited to the first embodiment described above. A portable computer according to the second embodiment of the invention will now be described, with reference to FIGS. 16 and 17.

Figure 16:
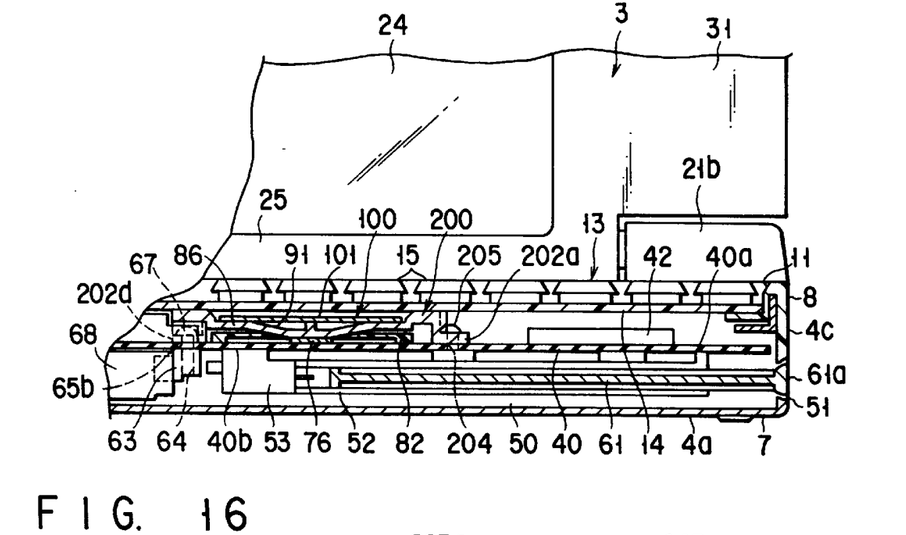
FIG. 16 is a sectional view of a portable computer according to a second embodiment of the present invention.
Figure 17:
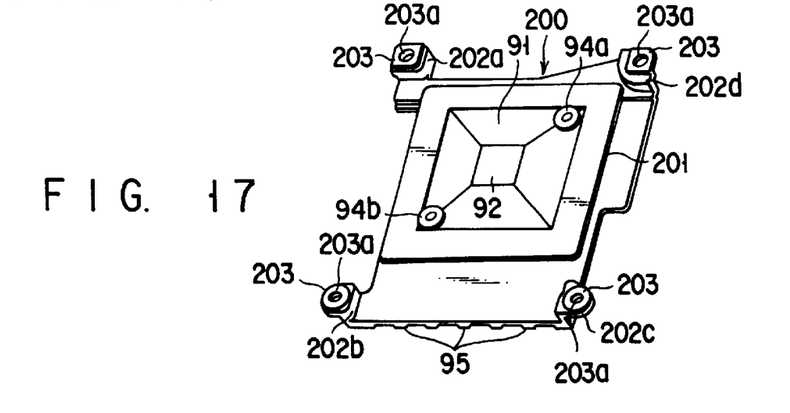
FIG. 17 is a perspective view of the heatsink.

As seen from FIGS. 16 and 17, the second embodiment differs from the first embodiment in the structure of the heat-receiving section 201 of the heatsink 200. The section 201 is substantially square and has four corners. It is somewhat larger than the lead cover 82. Four legs 202a to 202d are formed integral with the corners of the heat-receiving section 201, each extending downwards from the section 201. The first leg 202a and the second leg 202b are spaced apart in the depthwise direction of the housing 2. So are the third leg 202c and the fourth leg 202d. The legs 202a to 202d have a seat 203 each, which contacts the upper surface 40a of the circuit board 40. The seat 203 of each leg has a through hole 203a.

The circuit board 40 has two screw holes 204 (only one shown in FIG. 16). The screw holes 204 are axially aligned with the through holes 203a of the first and second legs 202a and 202b, respectively. Two screws 205 pass from above through the holes 203a and are set in the screw holes 204. The heatsink 200 is thereby fastened to the circuit board 40.

The holes 203a of the third and fourth legs 202c and 202d are axially aligned with the through holes 65a and 65b made in the circuit board 40. Two screws 67 pass from above through the holes 203a of the third and fourth legs 202c and 202d and are set in the two screw holes 64 made in the hard disk connector 63. The heatsink 200 is thereby fastened to the circuit board 40.

In the second embodiment, the screws 67 serving the primary purpose of fastening the hard disk connector 63 to the circuit board 40 are used also to fasten the legs 202c and 202d of the heatsink 200 to the circuit board 40. Thus, the heatsink 200 is firmly secured to the circuit board 40 by using four screws, i.e., two screws 67 and two screws 204, though only two screw holes 204 are made in the circuit board 40. Since the circuit board 40 has only two holes for fastening the heatsink 200 to the board 40, the board 40 has a larger component-mounting area than in the case where it has four holes as in the conventional portable computer.

In both embodiments described above, the TCP is mounted on the upper surface of the circuit board. Instead, the TCP may be mounted on the lower surface of the circuit board in any portable apparatus according to the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. An electronic apparatus comprising:
   a housing;
   a circuit board provided in said housing;
   a heat generating element;
   a first function component separate from the heat generating element and secured to said circuit board by first screws;
   a second function component separate from the heat generating element and secured to said circuit board by second screws; and
   a heat sink mounted on said circuit board by said first screws and said second screws, for radiating heat generated by said heat generating element.

2. An electronic apparatus according to claim 1, wherein said housing comprises a top wall having an opening, a keyboard set in the opening of the top wall and including a keyboard panel fitted in the opening of the top wall and having an upper surface and a lower surface, a number of keys arranged on the upper surface of the keyboard panel and a reinforcing plate made of metal and covering the lower surface of the keyboard panel; and said heat sink contacts the reinforcing plate.

3. An electronic apparatus according to claim 2, wherein said housing has a shield made of metal and provided in the opening of said top wall, said shield being larger than said heat sink and contacting said reinforcing plate and said heat sink.

4. An electronic apparatus according to claim 1, wherein said circuit board has a first surface and a second surface opposing the first surface; said heating element and said heat sink are mounted on the first surface of said circuit board; said first and second function components are mounted on the second surface of said circuit board; said heat sink has a plurality of support sections contacting the first surface of said circuit board and vertically aligned with said first and second function components; and said first and second screws pass through said support sections and said circuit board and set in screw engagement with said first and second function components.

5. An electronic apparatus according to claim 4, wherein said heat sink includes a heat-receiving section for receiving heat from said heating element and a heat-dissipating section contacting the heat-receiving section, extending along said circuit board and around said heat-receiving section; and said support section is formed integral with said heat-dissipating section.

6. An electronic apparatus according to claim 5, further comprising a cover mounted on said circuit board, located between said circuit board and said heat sink and covering the heating element, said cover having an opening opposite the heat-receiving section of said heat sink, said heat-receiving section being thermally coupled to said heating element, with said opening interposed therebetween.

7. An electronic apparatus comprising:
   a housing comprising a lower housing made of metal and having a bottom wall, and an upper housing made of synthetic resin, removably coupled with the lower housing and having a top wall opposing said bottom wall;
   a circuit board provided in said housing having a heating element, and supported by the bottom wall of said lower housing;
   a function component fastened to said circuit board by screws;
   a heat sink connected to said circuit board by said screws and opposing the top wall of said upper housing, for radiating heat generated by said heating element; and a heat-dissipating plate secured to said heat sink and provided in said housing, for absorbing heat transmitted from said heating element to said heat sink, said heat-dissipating plate having a heat-dissipating section passing through said top wall and protruding in part from said housing.

8. An electronic apparatus according to claim 7, wherein said circuit board has a first surface opposing said top wall and a second surface opposing said bottom wall, and said heating element and said heat sink are mounted on the first surface of said circuit board, and said function component is mounted on the second surface of said circuit board.

9. An electronic apparatus according to claim 8, wherein said heat sink has a support section contacting the first surface of said circuit board and vertically aligned with said function component; and said screws pass through said support section and said circuit board and set in screw engagement with said function component.

10. An electronic apparatus according to claim 1, wherein said first function component and said second function component are arranged adjacent to each other.

11. An electronic apparatus according to claim 1, wherein said first function component is a card holder which includes a card connector to which an extension card is connectable.

12. An electronic apparatus according to claim 11, wherein said second function component is a hard disk connector to which a hard disk drive is connectable.

13. An electronic apparatus comprising:

a housing;

a circuit board provided in said housing and having a first mount region and a second mount region arranged in a position different from a position of the first mount region;

a function component provided on said first mount region of the circuit board;

a heat generating element separate from the function component and connected to said second mount region of the circuit board;

a plurality of screws for securing said function component to said circuit board; and a heat sink mounted on said circuit board by said screws, for radiating heat generated by said heat generating element.

14. An electronic apparatus according to claim 13, wherein said heat sink includes a heat-receiving section for receiving heat from said heating element and a heat-dissipating section contacting the heat-receiving section.

15. An electronic apparatus according to claim 14, further comprising a cover mounted on said second mount region of said circuit board, located between said circuit board and said heat sink and covering the heating element, said cover having an opening opposite the heat-receiving section of said heat sink, said heat-receiving section being thermally coupled to said heating element with said opening interposed therebetween.

* * * * *